United States Patent
Parker

(10) Patent No.: US 7,442,746 B2
(45) Date of Patent: Oct. 28, 2008

(54) EPOXIDATION OF UNSATURATED CATIONICALLY STABILIZED POLYMER LATEX

(75) Inventor: Dane Kenton Parker, Coshocton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/583,423

(22) Filed: Oct. 19, 2006

(65) Prior Publication Data

US 2008/0234438 A1    Sep. 25, 2008

(51) Int. Cl.
*C08C 19/06*    (2006.01)
*C08F 8/08*    (2006.01)
*C08F 36/04*    (2006.01)

(52) U.S. Cl. .............. 525/332.9; 525/328.3; 525/333.1; 525/333.2; 525/386; 525/387; 524/815; 524/836

(58) Field of Classification Search ................ 524/815, 524/836; 523/413; 525/332.9, 328.3, 333.1, 525/333.2, 386, 387
See application file for complete search history.

(56) References Cited

U.S. PATENT DOCUMENTS

| | | | | |
|---|---|---|---|---|
| 5,034,470 | A * | 7/1991 | Geiser et al. | 525/360 |
| 6,534,597 | B2 | 3/2003 | Adam et al. | 525/340 |
| 6,861,462 | B2 | 3/2005 | Parker et al. | 524/445 |
| 6,894,116 | B2 | 5/2005 | Lai et al. | 525/107 |
| 6,992,156 | B2 * | 1/2006 | Parker et al. | 526/204 |
| 2003/0120007 | A1 * | 6/2003 | Bortolotti et al. | 526/232 |
| 2003/0187138 | A1 | 10/2003 | Lai et al. | 525/115 |
| 2005/0256253 | A1 | 11/2005 | Parker et al. | 524/543 |

FOREIGN PATENT DOCUMENTS

| | | |
|---|---|---|
| EP | 0763564 | 3/2001 |
| GB | 2113692 | 8/1983 |
| WO | 0037555 | 6/2000 |

OTHER PUBLICATIONS

Gan et al, "Kinetic studies of the performic acid epoxidation of natural rubber latex stabilized by cationic surfactant", European Polymer Journal, vol. 22, Issue 7, 1986, pp. 573-576.*
Pages 609-515, "Epoxidation of low-molecular-weight *Euphorbia lactiflua* natural rubber with 'in situ' formed performic acid," by Gnecco et al., Polymer Bulletin 37, *Springer-Verlag*, published 1996.
Pages 2573-2576, "Effect of Acid Concentration and Other Reaction Parameters on Epoxidation of Natural Rubber Lates," by Sanjoy, et al., Ind. Eng. Chem. Res., *American Chemical Society*, published 1991.
Pages 573-576, "Kinetic Studies of the Performic Acid Epoxidation of Natural Rubber Latex Stabilized by Cationic Surfactant," by L.-H. Gan, et al., European Polymer Journal vol. 17, *Pergamon Journals Ltd.*, published 1986.
Pages 86-96, "Modification of Natural Rubber Latex with Peracetic Acid," by I. R. Gelling, Rubber Chemistry & Technology vol. 58, published 1984.
Pages 1073-1077, "Reaction of Natural Rubber Latex with Performic Acid," by S.-C. Ng, et al., European Polymer Journal vol. 17, *Pergamon Journals Ltd.*, published 1981.

* cited by examiner

*Primary Examiner*—Fred M Teskin
(74) *Attorney, Agent, or Firm*—John D. DeLong

(57) ABSTRACT

The present invention is directed to a process for synthesizing an epoxidized polymer that includes the steps of:

(1) preparing a cationically stabilized polymer latex containing at least one conjugated diolefin monomer in a first stage,
(2) treating the polymer latex from step (1) with formic or acetic acid and hydrogen peroxide, and
(3) allowing the mixture to react for a predetermined time and predetermined temperature to attain the desired level of epoxidation.

17 Claims, No Drawings

EPOXIDATION OF UNSATURATED CATIONICALLY STABILIZED POLYMER LATEX

BACKGROUND OF THE INVENTION

In general, the commercial synthesis and utility of epoxidized natural rubber (ENR) have been well documented. See, for example, http://www.rubber-stichting.ind.tno.nl/natuurrubber/Natuurrubber%2028.pdf, and references therein.

The usefulness of epoxidized elastomers for tire applications are well known, see for example, EP 763564 and WO 00/37555, for their discussion of partial or full replacement of sulfur-containing silane coupling agents by ENR to couple rubber to silica. Further, EP 763564 discloses an epoxidation method using the in-situ formation of performic acid in a two-phase system consisting of cyclohexane/hexane organic phase and an aqueous formic acid/30% hydrogen peroxide phase. This process by which the epoxidized rubber was formed and isolated is rather cumbersome, expensive, and impractical. Therefore, the need still exists for a simple and practical method to prepare epoxidized unsaturated elastomers for tire applications especially if they can be used to wholly or partially displace the need for sulfur-containing silanes to couple rubber to silica.

SUMMARY OF THE INVENTION

The present invention is directed to a process for synthesizing an epoxidized polymer that comprises the steps of:

(1) preparing a cationically stabilized polymer latex containing at least one conjugated diolefin monomer in a first stage, (2) treating the polymer latex from step (1) with formic or acetic acid and hydrogen peroxide, and (3) allowing the mixture to react for a predetermined time and predetermined temperature to attain the desired level of epoxidation.

DETAILED DESCRIPTION OF THE INVENTION

There is disclosed a process for synthesizing an epoxidized polymer that the comprises the steps of:

(1) preparing a cationically stabilized polymer latex containing at least one conjugated diolefin monomer in a first stage, (2) treating the polymer latex from step (1) with formic or acetic acid and hydrogen peroxide, and (3) allowing the mixture to react for a predetermined time and predetermined temperature to attain the desired level of epoxidation.

Increased oil resistance, lower gas permeability, high damping, and improved interaction with silica filler may be attained by epoxidation of the cationically stabilized polymer latex. Epoxidation can also result in improved tensile behavior as a result of high glass transition temperature (Tg) phase-separated block structures. In any case, lattices of epoxidized polymers have a combination of properties that can make them extremely useful in dipping applications, coatings, paints, latex blends, and the like. Further, epoxidized rubbers coagulated from a latex can be used advantageously in tires.

In one embodiment, the epoxidation of the cationically stabilized polymer latex may be done by a process which involves: (1) preparing a cationically stabilized polymer latex containing at least one conjugated diolefin monomer in a first stage, (2) treating the polymer latex from step (1) with formic or acetic acid and hydrogen peroxide, and (3) allowing the mixture to react for a predetermined time and predetermined temperature to attain the desired level of epoxidation. The epoxidized latex may then be coagulated, if desired, using methods as are known in the art. Alternatively, the epoxidized latex may be treated with sufficient amount of a hydrogen peroxide decomposing reagent or catalyst as are known in the art to effectively stop the epoxidation reaction and obtain a stable latex product.

In one embodiment, the epoxidation may be carried out in the presence of an at least partially water soluble stable nitroxyl radical compound. In one embodiment, the stable nitroxyl radical compound is 4-hydroxy-2,2,6,6-tetramethylpiperidine-N-oxyl (OH-TEMPO).

The mechanism of epoxidation with peracid is illustrated below for a cis 1,4-polyisoprene structure:

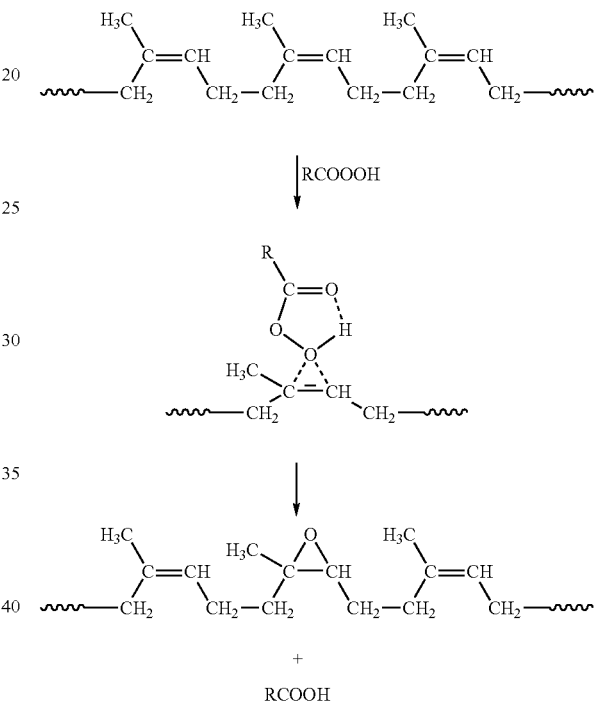

Although numerous examples exist in the literature whereby latexes (predominantly NR latex) are epoxidized in their latex form by the addition of a stabilizing surfactant, a carboxylic acid and hydrogen peroxide, no examples are known to exist where cationically stabilized acidic unsaturated polymer latexes, prepared by conventional or controlled free radical processes, have been epoxidized in a similar manner. Furthermore, no examples exist of the direct use of such epoxidized latexes (e.g. in dipping, coatings, paints, latex blends etc.)

The prior art begins the epoxidation process with an unsaturated latex stabilized with an anionic surfactant such as a fatty acid carboxylate, sulfonate or sulfate salt. This anionically stabilized latex then has added to it, a sufficient amount of a cationic or nonionic surfactant to stabilize the latex particles at a low pH (less than 3) after which, the addition of a combination of formic or acetic acid with hydrogen peroxide forms a peracid "in-situ." See for example, S Gnecco, A Pooley, M Krause, *Polymer Bulletin*, 37, 609 (1996); J Sanjoy, B Gupta, B Maiti, *Ind. Eng. Chem. Res.*, 30, 2573 (1991); S.-C. Ng, L.-H. Gan, *Eur. Poly. J.*, 17, 1073 (1981); L.-H. Gan, S.-C. Ng; *Eur. Poly. J.*, 22, 573 (1986); U.K. Patent 2,113,692; I Gelling, *Rubber Chem. & Technol.,* 58, 86 (1984). The peracid then reacts with the olefinic double bonds to give an epoxide. The amount of cationic or nonionic surfactant required to accomplish the desired stabilization at low pH can be quite substantial (greater than 4 phr in most cases). Such a large amount of nonionic surfactant can seriously hinder coagulation and/or result in contamination of the coagulated polymer.

In one embodiment of the present invention, the polymer latex is prepared by free radical cationic emulsion polymerization using:

(A) a non-polymerizable cationic surfactant, and/or (B) a polymerizable cationic surfactant.

Optionally, additional cationic charge may be incorporated onto the cationic elastomer latex particles, during the polymerization of the monomers to form the elastomer latex particles, through the use and in the presence of:

(C) a polymerizable, non-surfactant, comonomer bearing a cationic charge, (D) a free radical generating polymerization initiator bearing a cationic charge, and/or (E) a free radical chain transfer agent bearing a cationic charge.

It is to be appreciated that, conventionally, emulsion polymerization derived elastomeric styrene/butadiene copolymers, for example, are prepared by polymerizing the styrene and 1,3-butadiene monomers in a water emulsion medium via a free radical and redox polymerization initiators in the presence of an anionic surfactant. Representative examples of anionic surfactants may be found, for example, in *McCutcheon's,* Volume 1, "Emulsifiers & Detergents", North American Edition, 2001, Pages 291 and 292, with representative examples on non-ionic surfactants shown on Pages 294 through 300 and examples of cationic surfactants shown on Pages 300 and 301.

For the practice of this invention, anionic surfactants are to be excluded.

However, if desired, a minor amount of a nonionic surfactant might be used (e.g from zero to about 20, alternately about 0.1 to about 20 weight percent) of non-ionic surfactant based on the total of surfactants used.

Accordingly, for the practice of this invention, a cationically stabilized elastomer latex of, for example elastomers derived from at least one conjugated diolefin monomer to yield elastomers such as, for example, polyisoprene, styrene/butadiene rubber, cis 1,4-polybutadiene rubber and/or butadiene/acrylonitrile rubber, is required to be made as a result of free radically polymerizing the elastomer precursor monomers such as, for example, a combination of styrene and 1,3-butadiene monomers, 1,3-butadiene individually, isoprene individually, or a combination of 1,3-butadiene and acrylonitrile.

In one embodiment, the emulsion polymerization prepared cationically stabilized polymer latex is composed of water, elastomer particles, and one or more of a polymerizable cationic surfactant, non-polymerizable cationic surfactant, which act(s) as a stabilizer for the latex to aid in inhibiting the elastomer from coagulating from the latex as well as free radical polymerization initiator. The latex itself may be prepared, for example, by a free radical polymerization of the monomers in an acidic water-based medium in the presence of a free radical initiator and said cationic surfactant(s). A general description of an aqueous emulsion polymerization of styrene and 1,3-butadiene, albeit directed to an anionic surfactant (emulsifier) based polymerization, may be found, for example, in *The Vanderbilt Rubber Handbook,* 1978 Edition, Pages 55 through 61.

In one embodiment, the polymerization may be carried out at a generally acidic pH in a range of from about 0 to about 6. In another embodiment, the pH may range from about 1 to about 4. The pH may be adjusted using for example mineral acids such as hydrochloric acid, sulfuric acid, or the like.

Representative of the following cationic, anionic, neutral and redox free radical initiators are presented for illustrative purposes and are understood to be well known to those skilled in such art, although the invention is not intended to be limited to the following exemplary free radical polymerization initiators. In practice, often a cationic free radical polymerization initiator is preferred.

Representative of cationic free radical generating polymerization initiators are, for example, 2,2'azobis(2-methylpropionamidine) dihydrochloride and 2,2'azobis(N,N' dimethyleneisobutyramidine) dihydrochloride.

Representative of anionic free radical generating polymerization initiators are, for example potassium peroxydisulfate and ammonium peroxydisulfate. Such compounds are considered to be thermally unstable and decompose at a moderate rate to release free radicals. For example, a combination of the potassium peroxydisulfate with a mercaptan such as dodecyl mercaptan may be used to co-polymerize styrene and 1,3-butadiene wherein the dodecyl mercaptan is considered to act to promote formation of free radicals from the potassium peroxydisulfate as well as to limit, or control, the molecular weight of the copolymer elastomer.

Representative of neutral free radical generating polymerization initiators are, for example, benzoyl peroxide and azobisisobutyrolnitrile.

Representative of redox free radical generating polymerization initiators are a combination of materials which release free radicals and are well known to those skilled in such art. For example, redox polymerization initiator systems are described by G. S. Misra and U. D. Bajpai in *Prog. Polymer Science,* Volume 8, Pages 61 through 131 (1982).

The use of such free radical generating initiators for aqueous emulsion polymerization of conjugated diolefin monomer systems to form elastomers is well known to those having skill in such art.

Representative examples of non-free radically polymerizable cationic surfactants (e.g. cationic surfactants which do not readily undergo a free radical promoted polymerization in an aqueous medium) are chemicals having a surfactant activity in an aqueous medium in which they are present as cationic ions, such as, for example, various quaternary ammonium salts, various phosphonium salts and various sulfonium salts which are present as cationic ions in a water medium as is well known to those having skill in such art. For example, see U.S. Pat. No. 5,476,913. Also see L. H. Howland, et al, *Industrial & Engineering Chemistry,* Volume 44(4), Page 762 (1952). Representative of a non-free radically polymerizable cationic surfactant is, for example, cetyltrimethylammonium bromide (CTAB), or cetyltrimethylammonium chloride although the practice of the invention is not intended to be limited to such surfactant.

Representative of a cation-containing chain transfer agent is, for example, 2-aminophenyldisulfide dihydrochloride.

It should be appreciated that polymerizable cationic surfactants might also be polymerizable co-monomers in an aqueous medium but not necessarily visa versa.

Indeed, it is therefore to be appreciated that polymerizable monomers in a cationically stabilized aqueous medium are not necessarily polymerizable cationic surfactants.

Exemplary of compounds which exhibit at least some surfactant properties which may also be polymerizable monomers in an aqueous medium may be found, for example, in the reference: *Polymer*, 28, Page 325 (1987) by S. M. Hamid and D. C. Sherrintgton. In Table 2 of the reference, it is demonstrated that only quaternary salts of 2-dimethylaminoethyl methacrylate prepared from alkyl halides containing greater than seven carbon atoms exhibit a cmc (critical micelle concentration) in water at room temperature. With less than seven carbon atoms, the illustrated compounds are indicated to be suitable as polymerizable monomers but not as polymerizable surfactants.

In practice, non-free radially polymerizable cationic surfactants/monomers may be optionally be used in combination with free radically polymerizable cationic surfactants.

Also, it is contemplated herein that said non-free radically polymerizable cationic surfactant and/or free radically polymerizable cationic surfactant may contain from about 1 to about 20 weight percent non-ionic surfactant (based upon the total of said surfactants).

The use of cationic surfactants for emulsion polymerization of monomers such isoprene, 1,3-butadiene and styrene to form polyisoprene, polybutadiene, styrene/isoprene, or styrene/butadiene elastomers, while being known, is believed herein to be a departure from conventional practice.

Representative examples of free radically polymerizable surfactants are surfactants which contain free radically polymerizable groups such as for example, acrylate groups, methacrylate groups, styrl groups, acrylamide groups, methacrylamide groups and allyl groups.

Representative of such free radically polymerizable cationic surfactants are, for example, alkyl bromide (or chloride) quaternary salts of 2-dimethylaminoethyl methacrylate, polymerizable acrylate and methacrylate mono and diquaternary ammonium salts, alkyl bromide (or chloride) quaternary salts of meta or para vinylbenzene dimethylamine, alkyl bromide (or chloride) quaternary salts of N,N dimethylallylamine, alkyl bromide (or chloride) quaternary salts of ortho or para vinyl pyridine, alkyl bromide (or chloride) salt of vinyl imidazole, N-((11-methacryloyloxy)undecyl)-4-methylpyridinium bromide, 5-(para vinyl phenyl) pentyltrimethylammonium bromide, 11-methacrylolyundecyltrimethylammonium bromide, 11-acryloylundecyltrimethylammonium bromide, vinylbenzylamine hydrochloride, and aminoethylmethacrylate hydrochloride. For the above and additional polymerizable surfactants/monomers, see the *Journal of Applied Science*, Volume 65, Page 2315 (1957).

In one embodiment, the polymerization may be done using in-situ emulsification, which is achieved by reacting a "latent surfactant" with a "surfactant activator" to produce the surfactant for controlled emulsion polymerization. As used herein, the term "latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. The use of an in-situ emulsification technique in a controlled polymerization process that can be used in accordance with this invention is described in U.S. Pat. No. 6,992,156, incorporated herein by reference in its entirety.

The fundamental principles for in-situ microemulsification are described by Prokopov and Gritskova (*Russ. Chem.* Rev 2001, 70, 791), who review its use in conventional free-radical polymerization of styrene using alkali-metal soaps prepared in situ via neutralization of fatty acids. As explained by Prokopov and Gritskova, the preparation of a carboxylate soap at a styrene-water interface during emulsification can produce a fine microemulsion because interfacial tension is decreased significantly by an abundance of emulsifier produced at the interface. By varying the nature of the carboxylic acid and the metal counter-ion used in the surfactant synthesis at the interface, it was possible to control the degree of dispersion and stability of the emulsion, as well as the resulting polystyrene latex produced via conventional free radical polymerization. In the present invention, the principles of in-situ microemulsification are expanded broadly to produce emulsions suitable for controlled polymerization via a wide range of methods utilizing conventional soap levels without added hydrophobes or specialized emulsification equipment.

In some embodiments, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a pKb less than about the pKa of the monomer-soluble acid also may be suitable. It also will be evident that hydroxides generated in situ via hydrolysis of moisture-sensitive compounds, such as sodium methoxide, sodium amide, potassium hydride and the like, also may be suitable as surfactant activators.

For some types of cationic surfactants, in situ synthesis during emulsification may be accomplished, for example, via reaction of a monomer-soluble base with an aqueous acid, where the monomer-soluble base is the latent surfactant and the acid is the surfactant activator. Suitable monomer-soluble bases include, for example, hexadecyldimethylamine, hexadecyldimethylamine oxide, and amphiphilic nitrogen-containing heterocycles. Suitable acids include for example mineral acids, sulfonic acids and phosphonic acids. It will be evident to those skilled in the art that any aqueous acid with a pKa less than about the pKb of the monomer-soluble base also may be suitable. It also will be evident that acids generated in situ via: hydrolysis of moisture-sensitive compounds, such as Lewis acids, acyl halides, acyl anhydrides, mineral acid anhydrides, hydrolyzable transition-metal halides, main group halides and the like, also may be suitable as surfactant activators.

In some embodiments, surfactant may be produced in situ by chemical reactions that attach hydrophilic functionality to a functionalized hydrophobe. For these embodiments, the functionalized hydrophobe is the latent surfactant and the reagent or reagents necessary for attaching the hydrophilic functionality serve as surfactant activator. For some types of surfactants this may be accomplished, for example, via reaction of a monomer-soluble electrophile with an aqueous nucleophile. Suitable electrophiles include for example:
(i) hydrocarboyl halides;
(ii) hydrocarboyl esters;
(iii) hydrocarboyl anhydrides;
(iv) hydrocarbyl isocyanates;
(v) hydrocarbyl halides; and
(vi) hydrocarbyl esters of sulfonic acids.

Suitable surfactant activators include for example:
(i) amine-functionalized hydrocarbylsulfates, hydrocarbylcarboxylates, hydrocarbylphosphates, hydrocarbylammonium salts;
(ii) diethanol amine;
(iii) diethylenetriamine and other aminoamines;
(iv) amino-polyethyleneglycols and polyethyleneglycol ethers;
(v) aminoglycosides;
(vi) aminobetaines;
(vii) hydroxides of alkali metal ions and quaternary ammonium ions; and
(viii) hydrocarbylamines.

For some types of surfactants, in-situ synthesis and emulsification may be accomplished by reaction of a monomer-soluble nucleophile with an aqueous electrophile. Suitable nucleophiles include for example, hexadecylamine and hexadecyldimethylamine. Suitable electrophiles include for example succinic anhydride, dimethylsulfate and 1,3-propanesultone.

Many other reactions can be used to synthesize surfactants in situ, and the specific embodiments illustrated above are not intended to preclude any combination of latent surfactant/surfactant activator that produces a surfactant during emulsification. It will be evident to those skilled in the art that other latent surfactant/surfactant activator combinations may be suitable when the chemistries of surfactant synthesis and controlled polymerization are compatible.

In one embodiment, the polymerization may be done using any of the various so-called controlled free-radical polymerization (CFRP) techniques, including reversible-addition fragmentation transfer (RAFT), nitroxide-mediated polymerization (NMP), atom transfer radical polymerization (ATRP), and degenerative transfer (DT). Methods for polymerization via CFRP may be a described in U.S. Pat. No. 6,992,156, fully incorporated herein by reference.

In one embodiment, the polymerization is done using a RAFT method utilizing a trithiocarbonate control agent. In one embodiment, the trithiocarbonate control agents are as disclosed in Ser. No. 60/753,145 filed Dec. 22, 2005, fully incorporated herein by reference. As disclosed therein, the RAFT control agents are of the structural formula:

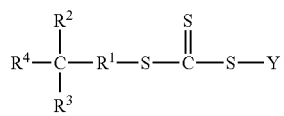

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or —COOH, with the proviso that the total carbon atoms of $R^1$, $R^2$, and $R^3$ is no greater than 12; and wherein Y represents a functional group that is capable of activating a vinylic carbon toward free radical addition.

In one embodiment, Y represents a functional group selected from the group consisting of —C(R')$_2$CN, —C(CH$_3$)$_2$Ar, —C(CH$_3$)$_2$COOR', —C(CH$_3$)$_2$CONHR', —C(CH$_3$)$_2$CH$_2$C(CH$_3$), —CH(CH$_3$)Ar, —CH$_2$Ar, —C(CH$_3$)$_3$, —CR'$_2$COOH, —C(R')(CN)—(CH$_2$)$_n$—COOH, and —C(R')(CN)—(CH$_2$)$_n$—OH; wherein R' represents a linear or branched hydrocarbon containing from 1 to 12 carbon atoms; wherein Ar represents an unsubstituted or substituted phenyl, napthyl, anthracenyl, pyrenyl or pyridyl group; and wherein n represents an integer from 1 to 8.

In another embodiment, Y represents a function group selected from the group consisting of benzyl, picolyl, or t-butyl.

In another embodiment, $R^1$ is a divalent alkyl group of 1 to 4 carbon atoms, i.e., $R^1$ is (CH$_2$)$_m$ where m ranges from 1 to 4.

In another embodiment, $R^1$ is (CH$_2$)$_9$, $R^2$ and $R^3$ are hydrogen, $R^4$ is —COOH, Y is benzyl, and the free radical control agent is S-benzyl-S'-(11-undecanoic acid) trithiocarbonate.

In another embodiment, $R^1$ is CH$_2$, $R^2$ is (CH$_2$)$_8$, $R^3$ is hydrogen, $R^4$ is —OH, Y is benzyl, and the free radical control agent is S-benzyl-S'-(2-hydroxydecyl) trithiocarbonate (BHDTTC).

In another embodiment, $R^1$ is CH$_2$, $R^2$ is (CH$_2$)$_8$, $R^3$ is hydrogen, $R^4$ is —OH, Y is 4-picolyl, and the free radical control agent is S-(4-picolyl)-S'-(2-hydroxydecyl) trithiocarbonate.

Polymers produced using the process of the invention may be used in rubber compositions in tire components. Such components may include but are not limited to treads, sidewalls, sidewall inserts, plycoats, apexs, chafers, wire coats, and the like. It is readily understood by those having skill in the art that rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black and silica. As known to those skilled in the art, depending on the intended use of the sulfur vulcanizable and sulfur vulcanized material (rubbers), the additives mentioned above are selected and commonly used in conventional amounts. The components and tire can be built, shaped, molded and cured by various methods which will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

The Controlled Cationically Stabilized Emulsion Polymerization of Styrene/Butadiene using S-benzyl-S'-(2-hydroxydecyl) trithiocarbonate (BHDTTC)

A 2 gallon reactor was initially flushed with nitrogen before being charged with a solution prepared from 540 g (5.19 moles) of styrene, 81.0 g (~0.27 moles) of N,N-dimethyloctadecylamine and 4.77 g (~0.0123 moles) of BHDTTC and stirred at 200 rpm. To this mixture was then added an aqueous solution prepared from 3510 g of RO water, 12.6 g (0.0466 moles) of potassium persulfate and 33.66 g of concentrated hydrochloric acid (~0.34 moles). The reactor was again flushed with nitrogen before adding 1260 g (~23.33 moles) of distilled butadiene. The stirred reactor was then heated to 65° C. with "solids" being taken every 2 hours to follow the progress of the polymerization. The reaction was shortstopped at ~23% solids (~65% conversion) with 45 g of a 2% aq. solution of 4-hydroxy TEMPO after 10.5 hours. The latex was then cooled and vacuumed stripped of residual monomers to yield a final latex with 24.1% solids, pH 1.53, viscosity of 352 cps, mechanical stability of 221 mg and an alcohol Mooney (ML4) of 37. NMR analysis indicates 23.3% styrene, 62.3% 1,4-butadiene and 14.4% 1,2-butadiene.

EXAMPLE 2

Epoxidation of Cationically Stabilized Latex of Example 1 Using a Combination of Hydrogen Peroxide and Formic Acid at Ambient Temperature A 250 ml bottle containing a magnetic stir bar was charged with 100 g of Example 1 latex (~22.7 g of rubber containing ~0.36 moles of double bonds). While stirring, an aqueous solution of 9.42 g (~0.18 moles) of 88% formic acid in 50 ml of water were added all at once. This was followed by the addition of an aqueous solution of 6.5 g (~0.09 moles) of 47% hydrogen peroxide. The bottle was loosely capped and allowed to stand for 41 days at room temperature. The latex was then coagulated in excess isopropyl alcohol containing a small amount of a phenolic antioxidant. Polymer was then washed in dilute KOH solution followed extensive water washing. The largely insoluble polymer was then dried at 50° C. and analyzed by C13 NMR to determine the level of epoxidation. The analysis indicated 15 mole % epoxidation with no ring opened products detected.

EXAMPLE 3

Epoxidation of Cationically Stabilized Latex of Example 1 Using a Combination of Hydrogen Peroxide and Formic Acid at 60° C.

A 400 ml beaker containing a magnetic stir bar was charged with 191 g of Example 1 latex (~g of rubber containing ~0.72 moles of double bonds). While stirring, 6.28 g (~0.12 moles) of 88% formic acid was added to the stirred latex followed by the addition of 4.34 g (~0.06 moles) of 47% hydrogen peroxide. The stirred latex was then heated on a hot plate at 60-65° C. for 6 hrs. Approximately 1 phr of a phenolic antioxidant as a 50% aq. dispersion was then added to the latex before coagulating the latex with a aq. solution of calcium chloride and potassium hydroxide. Polymer was then filtered, washed and dried in hood at room temperature. The largely insoluble polymer was then analyzed by C13 NMR to determine the level of epoxidation. The analysis indicated 2.2 mole % epoxidation with no ring opened products detected.

EXAMPLE 4

Epoxidation of Cationically Stabilized Latex of Example 1 Using a Combination of Hydrogen Peroxide and Formic Acid at Ambient Temperature in the Presence of OH-TEMPO The same apparatus and quantities of latex, formic acid and hydrogen peroxide were used as in Example 3 except for the addition of 2 g of a 2% aq. solution of 4-hydroxy TEMPO as a gel inhibitor. The reaction was run for 4 days at room temperature. Approximately 1 phr of a phenolic antioxidant as a 50% aq. dispersion was then added to the latex before coagulating the latex with a aq. solution of calcium chloride and potassium hydroxide. Polymer was then filtered, washed and dried at 50° C. It was observed that this sample contained much less gel than that of Example 3. C13 NMR analysis indicated 1.6 mole % epoxidation with no ring opened products detected.

EXAMPLE 5

Epoxidation of Cationically Stabilized Latex of Example 1 Using a Combination of Hydrogen Peroxide and Formic Acid at 60° C. in the Presence of OH-TEMPO.

The same apparatus and quantities of latex, formic acid and hydrogen peroxide were used as in Example 3 except for the addition of 4 g of a 2% aq. solution of 4-hydroxy TEMPO as a gel inhibitor. The reaction was run for 2.5 hrs at 60° C. In a separate 2 liter beaker equipped with a mechanical agitator was charged 1000 ml of water and ~2.5 g of a 50% aqueous dispersion of a phenolic antioxidant. All of the epoxidized SBR latex was poured into the water/AO mixture to dilute it. While stirring this mixture at room temperature, sufficient 20% potassium hydroxide solution was slowly added to reach a pH of ~10. A uniform polymer crumb formed during this process. The crumb was then filtered with the aid of a 100 mesh screen and washed extensively with water before being dried in a circulating air oven at 50° C. It was observed that this sample contained much less gel than that of Example 3. C13 NMR analysis indicated 1.8 mole % epoxidation with no ring opened products detected.

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing an epoxidized polymer comprising the steps of:
   (1) preparing a cationically stabilized polymer latex by polymerizing at least one monomer comprising at least one conjugated diolefin monomer in a first stage, wherein the polymerization is a free radical polymerization carried out in the presence of (a) a latent surfactant and a surfactant activator or (b) a polymerizable cationic surfactant,
   (2) treating the polymer latex from step (1) with formic or acetic acid and hydrogen peroxide, and
   (3) allowing the mixture to react for a predetermined time and predetermined temperature to attain the desired level of epoxidation.

2. The process of claim 1, wherein the polymerization is a free radical polymerization carried out in the presence of a latent surfactant and a surfactant activator.

3. The process of claim 2, wherein the latent surfactant is a monomer-soluble base and the surfactant activator is an aqueous acid.

4. The process of claim 1, wherein the polymerization is a free radical polymerization carried out in the presence of a polymerizable cationic surfactant.

5. The process of claim 4 wherein the polymerizable cationic surfactant is selected from the group consisting of alkyl bromide (or chloride) quaternary salts of 2-dimethylaminoethyl methacrylate, polymerizable acrylate and methacrylate mono and diquaternary ammonium salts, alkyl bromide (or chloride) quaternary salts of meta or para vinylbenzene dimethylamine, alkyl bromide (or chloride) quaternary salts of N,N-dimethylallylamine, alkyl bromide (or chloride) quaternary salts of ortho or para vinyl pyridine, alkyl bromide (or chloride) salt of vinyl imidazole, N-((11-methacryloyloxy) undecyl)-4-methyl pyridinium bromide, 5-(para vinyl phenyl)pentyltrimethylammonium bromide, 11-methacryloly-undecyltrimethylammonium bromide, 11 acryloylundecyltrimethylammonium bromide, vinylbenzylamine hydrochloride, and aminoethylmethacrylate hydrochloride.

6. The process of claim 1 wherein the polymerization is a free radical polymerization using a control agent for controlled free radical polymerization.

7. The process of claim 6 wherein the control agent is an agent for reversible addition-fragmentation transfer polymerization.

8. The process of claim 6 wherein the control agent is an agent for atom transfer radical polymerization.

9. The process of claim 6 wherein the control agent is an agent for nitroxide-mediated polymerization.

10. The process of claim 6 wherein the control agent is an agent for degenerative transfer polymerization.

11. The process of claim 1 wherein the at least one monomer comprises a conjugated diolefin monomer and a vinyl aromatic monomer.

12. The process of claim 11 wherein the conjugated diolefin monomer is selected from 1,3-butadiene and isoprene.

13. The process of claim 11 wherein the vinyl aromatic monomer is styrene.

14. The process of claim 1 wherein the at least one monomer is isoprene.

15. The process of claim 7 wherein the control agent is of the structural formula:

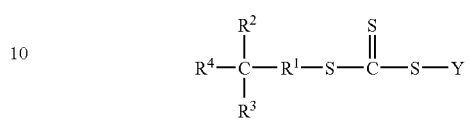

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or
—COOH, with the proviso that the total carbon atoms of $R^1$, $R^2$, and $R^3$ is no greater than 12; and wherein Y represents a functional group that is capable of activating a vinylic carbon toward free radical addition.

16. The process of claim 1 wherein step (2) is carried out in the presence of an at least partially water soluble stable nitroxyl radical compound.

17. The process of claim 16 wherein the stable nitroxyl radical compound is 4-hydroxy-2,2,6,6-tetramethylpiperidine-N-oxyl.

* * * * *